Patented Apr. 14, 1953

2,634,823

UNITED STATES PATENT OFFICE 2,634,823

METHOD FOR RECOVERY OF HYDROGEN CYANIDE

Lewis R. Drake, Stephen C. Stowe, and Kenneth F. Broucek, Midland, Mich., assignors to The Dow Chemical Company, Midland, Mich., a corporation of Delaware No Drawing. Application January 22, 1951, Serial No. 207,235

7 Claims. (Cl. 183—115)

1

The invention relates to the extraction and recovery of hydrogen cyanide from gaseous mixtures containing the same. It relates as well to certain new liquid compositions containing hydrogen cyanide as a solute.

It has long been customary in removing hydrogen cyanide from gaseous mixtures, to contact the mixture with an aqueous solution of a basic compound. Recovery of the acidic component from such solutions has generally proven to be unsatisfactory and inefficient.

Various organic liquids have also been employed for extracting and recovering hydrogen cyanide from gaseous mixtures. The efficiency of these solvents in removing hydrogen cyanide from gaseous mixtures, and subsequently in regenerating the hydrogen cyanide, is dependent primarily upon the difference between the respective vapor pressures of the solvent and of the dissolved hydrogen cyanide, and upon the degree of selectivity of the solvent for hydrogen cyanide in the original gaseous mixture. Solvents heretofore employed for this purpose have been useful, but their hydrogen cyanide solutions, even when dilute, exhibit a relatively high partial vapor pressure of hydrogen cyanide at room temperature. The lower the partial pressure of the gaseous solute, and the more hydrogen cyanide which can be dissolved per unit volume of solvent the better the solvent is deemed to be as a hydrogen cyanide absorbent and retainer. A class of solvents whose hydrogen cyanide solutions can be more concentrated than those of the prior art and still exert a substantially lower partial vapor pressure of hydrogen cyanide is much to be desired. Chemical stability of the solvent, during the extraction and regeneration process, is also desired.

It is an object of this invention to provide a method for the absorption and recovery of hydrogen cyanide from gaseous mixtures containing the same. A related object is to provide new and useful compositions containing dissolved hydrogen cyanide. Another object is to provide a new class of chemically stable solvents wherein hydrogen cyanide is efficiently absorbed and retained and from which the hydrogen cyanide may be recovered easily in substantially pure condition upon further treatment. A further object is to provide a new class of solvents whose hydrogen cyanide solutions exert an exceptionally low partial vapor pressure of hydrogen cyanide at room temperature.

According to the present invention, hydrogen cyanide is absorbed from gaseous mixtures containing the same by contact extraction of the mixture with a solvent of the class comprising those phosphoryl compounds which are ordinarily liquid at room temperature and have the following general formula:

wherein each R is a member selected from the group consisting of alkyl, alkoxy, and dialkylamido radicals containing from 1 to 4 carbon atoms. The phosphoryl compounds of this class selectively absorb and effectively retain, for long periods of time, hydrogen cyanide at or near room temperature. Substantially pure hydrogen cyanide is recovered by heating the hydrogen cyanide solution of the invention at normal pressures or by applying reduced pressures thereto at more moderate temperatures, and thereby separating the gaseous solute from the solvent.

Compounds of the above class, suitable for use as solvents in the present invention, include trimethyl, triethyl, methyl diethyl, and ethyl dimethyl phosphates, dimethyl methanephosphonate, dimethyl ethanephosphonate, dimethyl propanephosphonate, dimethyl butanephosphonate, diethyl ethanephosphonate, tris-(dimethylamido) phosphine oxide, and bis - (dimethylamido) methyl phosphate. The liquid compounds of this class are chemically stable and form hydrogen cyanide solutions having an unusually low partial vapor pressure of hydrogen cyanide at room temperature. The new solutions, having hydrogen cyanide concentrations of about 2 normal, exert partial vapor pressures of hydrogen cyanide in the range of about 3 to 20 millimeters of mercury at 25° C.

The method of the present invention is conveniently carried out by countercurrently contacting a mixture of gases containing hydrogen cyanide, with a solvent selected from the class heretofore defined. The gaseous mixture may be fed into the base of a scrubbing tower as the solvent is introduced into the top of the tower. The absorption reaction is conveniently carried out at room temperature. The rates of flow of the gas and solvent may be so adjusted that the hydrogen cyanide is completely removed from the mixture of gases. Any desired point of saturation of hydrogen cyanide in the solvent may be obtained, but usually about 50 per cent saturation is most convenient. The resulting solution of hydrogen cyanide may be stored for long periods of time without substantially decomposition. When desired, it may be transferred to any suitable apparatus, such as a distillation tower, wherein a substantially pure hydrogen cyanide may be recovered by heating the solution, or applying reduced pressure thereto, or both. The solvent may be returned to the absorption tower for reuse.

It has been found that the absorption and retention of hydrogen cyanide in a particular solvent is a function of the partial vapor pressure of hydrogen cyanide over its solution in the solvent at a given temperature. It is known that most high boiling solvents exert negligible vapor pressures at about 25° C. Therefore, the lower the partial vapor pressure exerted by hydrogen cyanide, at 25° C., over a standard solution of hydrogen cyanide in such a solvent, the greater is the tendency for that solvent to retain hydrogen cyanide at that temperature. Various solvents have been tested to determine their relative capacities to retain hydrogen cyanide. The following table evaluates this characteristic with respect to some representative members of the class of phosphoryl compounds useful in this invention. The solvents were evaluated according to the partial vapor pressure (in millimeters of mercury) of hydrogen cyanide exerted over a 2 normal solution of hydrogen cyanide in the respective solvents at 25° C. For purposes of comparison, diethylene oxide (1,4-dioxane), one of the best of the known solvents for hydrogen cyanide, was included as the blank, and evaluated in the same manner as the solvents employed in the method of the present invention.

| Solvent | HCN Partial Pressure |
|---|---|
| Diethylene oxide (dioxane) | 64.0 |
| Triethyl phosphate | 19.5 |
| Trimethyl phosphate | 18.5 |
| Dimethyl methanephosphonate | 14.3 |
| Diethyl ethanephosphonate | 12.3 |
| Dimethyl ethanephosphonate | 10.5 |
| Bis-(dimethylamido)methyl phosphate | 5.0 |
| Tris-(dimethylamido)phosphine oxide | 3.2 |

The above table indicates that the solvents employed in the compositions of the present invention are from 3 to twenty times more efficient in absorbing and retaining hydrogen cyanide than is dioxane.

In a specific example, a gaseous mixture of 94 per cent nitrogen and 6 per cent hydrogen cyanide is scrubbed in a bubble cap column with tris-(dimethylamido)phosphine oxide at room temperature. The rates of flow are adjusted to absorb substantially all hydrogen cyanide in the solvent. The resulting 10 per cent solution of hydrogen cyanide is heated under a reduced pressure of 50 millimeters of mercury in a still, from which the hydrogen cyanide is collected and chilled to liquefy it. The recovered hydrogen cyanide represents about 95 per cent of that in the original gas mixture and about 97 per cent of that in the solution obtained in the scrubbing tower.

We claim

1. A method for the removal of hydrogen cyanide from gaseous mixtures containing the same, which comprises the step of contact extraction of the mixture with a solvent selected from the class consisting of phosphoryl compounds which are liquid at room temperature and have the general formula

wherein each R is independently selected from the group consisting of alkyl, alkoxy, and dialkylamido radicals containing from 1 to 4 carbon atoms.

2. A method for the removal of hydrogen cyanide from gaseous mixtures containing the same which comprises the step of countercurrently contacting the mixture with a solvent selected from the class consisting of phosphoryl compounds which are liquid at room temperature and have the general formula

wherein each R is independently selected from the group consisting of alkyl, alkoxy, and dialkylamido radicals containing from 1 to 4 carbon atoms.

3. The method as claimed in claim 2 wherein the solvent is tris-(dimethylamido) phosphine oxide.

4. The method as claimed in claim 2 wherein the solvent is triethyl phosphate.

5. The method as claimed in claim 2 wherein the solvent is dimethyl ethane phosphonate.

6. The method as claimed in claim 2 wherein the solvent is diethyl ethane phoshonate.

7. The method as claimed in claim 2 wherein the solvent is trimethyl phosphate.

LEWIS R. DRAKE.
STEPHEN C. STOWE.
KENNETH F. BROUCEK.

References Cited in the file of this patent

UNITED STATES PATENTS

| Number | Name | Date |
|---|---|---|
| 2,064,838 | Knapp | Dec. 22, 1936 |